US010625645B2

(12) United States Patent
Baisch et al.

(10) Patent No.: US 10,625,645 B2
(45) Date of Patent: Apr. 21, 2020

(54) TRIM CLIP

(71) Applicant: LEAR CORPORATION, Southfield, MI (US)

(72) Inventors: Ashley L. Baisch, Washington Township, MI (US); Mark Allyn Folkert, Farmington Hills, MI (US); Thomas A. Welch, Sr., Ortonville, MI (US); Randall Riddle, Troy, MI (US); William J. Paruszkiewicz, Jr., Clinton Township, MI (US)

(73) Assignee: LEAR CORPORATION, Southfield, MI (US)

( * ) Notice: Subject to any disclaimer, the term of this patent is extended or adjusted under 35 U.S.C. 154(b) by 408 days.

(21) Appl. No.: 15/430,732

(22) Filed: Feb. 13, 2017

(65) Prior Publication Data

US 2018/0229634 A1 Aug. 16, 2018

(51) Int. Cl.
*B60N 2/58* (2006.01)
*A47C 7/24* (2006.01)
*A47C 31/02* (2006.01)

(52) U.S. Cl.
CPC .............. *B60N 2/5825* (2013.01); *A47C 7/24* (2013.01); *A47C 31/02* (2013.01)

(58) Field of Classification Search
CPC ...... B60N 2/58; B60N 2/5816; B60N 2/5825; B60N 2/5841; B60N 2/72; B60N 2/60; B60N 2/6018; B60N 2/6027; A47C 7/24; A47C 31/02; A47C 31/023
See application file for complete search history.

(56) References Cited

U.S. PATENT DOCUMENTS

| | | | | |
|---|---|---|---|---|
| 6,048,025 | A * | 4/2000 | Tillner | A47C 31/023 24/601.2 |
| 7,901,002 | B2 * | 3/2011 | Mashimo | B60N 2/5825 297/218.3 |
| 8,690,257 | B2 | 4/2014 | Stiller et al. | |
| 8,857,018 | B2 * | 10/2014 | Murasaki | A47C 31/023 24/297 |
| 8,998,310 | B2 | 4/2015 | Lovasz et al. | |
| 9,199,564 | B2 | 12/2015 | Clauser et al. | |
| 9,315,134 | B2 | 4/2016 | Kheil et al. | |
| 9,526,302 | B2 * | 12/2016 | Saiga | A44B 17/0064 |
| 9,827,890 | B2 * | 11/2017 | Saiga | B60N 2/5825 |
| 9,873,363 | B2 * | 1/2018 | Kheil | B60N 2/5825 |
| 2012/0284974 | A1 * | 11/2012 | Yamamoto | A47C 31/023 24/458 |
| 2013/0247338 | A1 * | 9/2013 | Santin | F16B 2/22 24/545 |

(Continued)

FOREIGN PATENT DOCUMENTS

| CA | 2749402 A1 * | 9/2010 | ........... B60N 2/5825 |
|---|---|---|---|
| DE | 102005012320 A1 * | 9/2006 | ........... B60N 2/5825 |

(Continued)

*Primary Examiner* — Ryan D Kwiecinski
(74) *Attorney, Agent, or Firm* — Brooks Kushman P.C.

(57) ABSTRACT

A trim clip is provided for attaching a trim cover to a cushion. The trim clip includes a clip body having a first opening for receiving an engagement feature attached to the trim cover, and a second opening for receiving a retainer attached to the cushion. Furthermore, the clip body may be configured to be snap fit onto the engagement feature and the retainer.

17 Claims, 3 Drawing Sheets

(56) References Cited

U.S. PATENT DOCUMENTS

| | | | |
|---|---|---|---|
| 2014/0068900 A1* | 3/2014 | Lovasz | A47C 31/023 24/543 |
| 2016/0174719 A1* | 6/2016 | Saiga | B68G 7/12 24/531 |
| 2016/0249746 A1* | 9/2016 | Saiga | A47C 31/023 24/545 |
| 2016/0311352 A1* | 10/2016 | Kheil | B60N 2/5825 |
| 2018/0162719 A1* | 6/2018 | Matsumura | A47C 31/023 |
| 2018/0304782 A1* | 10/2018 | Yoshino | B60N 2/5825 |

FOREIGN PATENT DOCUMENTS

| | | | | |
|---|---|---|---|---|
| DE | 102015015700 A1 | * | 6/2016 | B60N 2/5825 |
| EP | 2052905 A2 | * | 4/2009 | B60N 2/5825 |
| FR | 2735960 A1 | * | 1/1997 | B60N 2/5825 |
| JP | 2007326186 A | * | 12/2007 | B60N 2/5825 |
| JP | 3163446 U | * | 10/2010 | F16B 5/06 |
| JP | 2017018561 A | * | 1/2017 | B68G 7/05 |
| WO | WO-2012150633 A1 | * | 11/2012 | B60N 2/5825 |
| WO | WO-2013069114 A1 | * | 5/2013 | B68G 7/12 |
| WO | WO-2015029131 A1 | * | 3/2015 | F16B 2/22 |
| WO | WO-2015063944 A1 | * | 5/2015 | B60N 2/5825 |

\* cited by examiner

TRIM CLIP

TECHNICAL FIELD

This application relates to a trim retention clip that may secure a trim cover.

BACKGROUND

Trim clips may be used to secure a trim cover on a portion of a vehicle seat. Examples of such trim clips are disclosed in U.S. Pat. Nos. 8,998,310 and 9,199,564.

SUMMARY

According to an aspect of the disclosure, a trim clip is provided for attaching a trim cover to a cushion. The trim clip includes a clip body having a first opening for receiving an engagement feature attached to the trim cover, and a second opening for receiving a retainer attached to the cushion. Furthermore, the clip body may be configured to be snap fit onto the engagement feature and the retainer.

A seat assembly according to the disclosure may comprise a trim clip including a clip body having first and second openings. The seat may further include a trim cover assembly having a trim cover and an engagement feature connected to the trim cover, and a seat pad assembly including a seat pad and a retainer connected to the seat pad. The engagement feature of the trim cover assembly may be snap fit into the first opening of the clip body, and the retainer of the cushion assembly may be snap fit into the second opening of the clip body.

A vehicle seat assembly according to the disclosure may comprise a support structure, a seat pad assembly positioned proximate the support structure, a trim cover assembly disposed proximate the seat pad assembly, and a trim clip that couples the trim cover assembly to the seat pad assembly. The seat pad assembly may include a seat pad and a retainer connected to the seat pad, the trim cover assembly may include a trim cover and an engagement feature connected to the trim cover, and the trim clip may include a clip body having a flexible arm that at least partially defines a first opening and a pair of flexible legs that at least partially define a second opening. Furthermore, the engagement feature of the trim cover assembly may be received in the first opening of the trim clip, and the retainer of the seat pad assembly may be received in the second opening of the trim clip. In addition, the arm of the trim clip may have an end with a barb for retaining the engagement feature in the first opening, and each of the legs of the trim clip may have a barb for retaining the retainer in the second opening.

While exemplary embodiments are illustrated and disclosed, such disclosure should not be construed to limit the claims. It is anticipated that various modifications and alternative designs may be made without departing from the scope of the invention.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
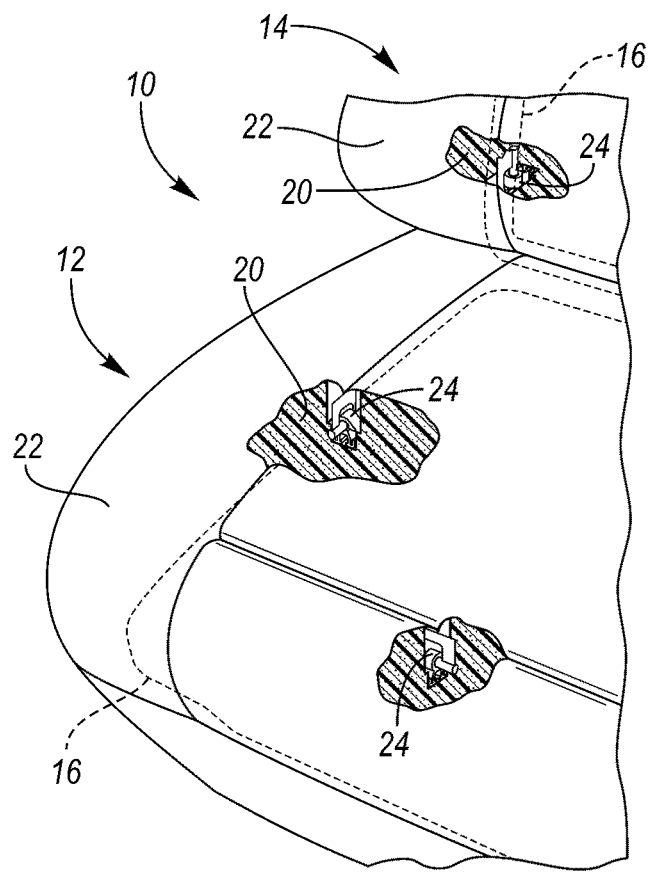
FIG. 1 is a fragmentary perspective view of a vehicle seat assembly, according to the present disclosure, comprising a seat bottom and a seat back that each include a cushion assembly, a trim cover assembly, and multiple trim clips according to the disclosure for attaching the trim cover assembly to the cushion assembly.

FIG. 1 shows a portion of a seat assembly 10 according to the present disclosure. The seat assembly 10 may be configured for use in a vehicle, such as a car, truck, aircraft, or marine vessel. As another example, the seat assembly 10 may be configured for non-vehicular applications, such as an office chair or other seating application.

The seat assembly 10 may include a seat bottom 12 and a seat back 14. The seat bottom 12 and the seat back 14 may each include a support structure 16, such as a seat frame, seat pan, and/or support wires such as a suspension mat. The seat bottom 12 and the seat back 14 may also each include a seat pad assembly or cushion assembly 20 disposed proximate a corresponding support structure 16, and a trim cover assembly 22 that is attached to the cushion assembly 20 with one or more trim clips 24 according to the disclosure, as explained below in detail.

Figure 2:
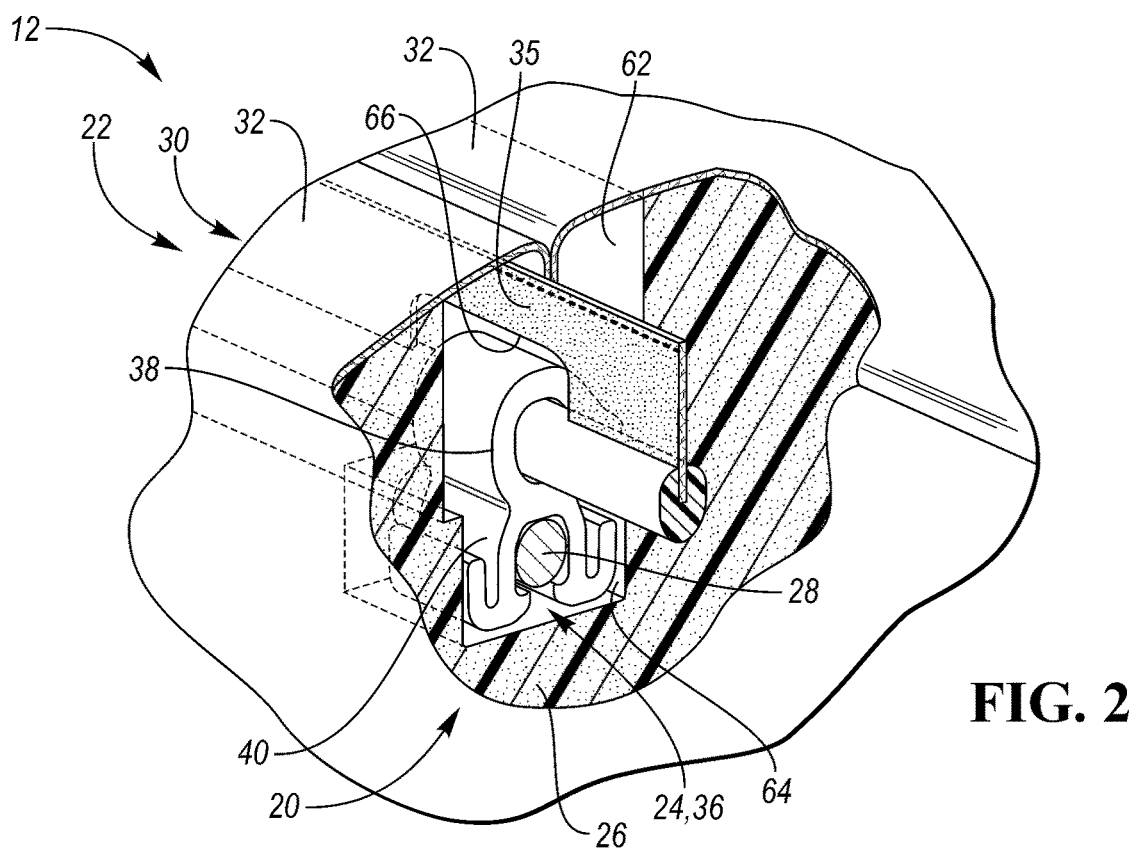
FIG. 2 is an enlarged fragmentary, cross-sectional perspective view of a portion of the seat bottom of FIG. 1, showing one of the trim clips attached to the cushion assembly and the trim cover assembly of the seat bottom.
Figure 3:
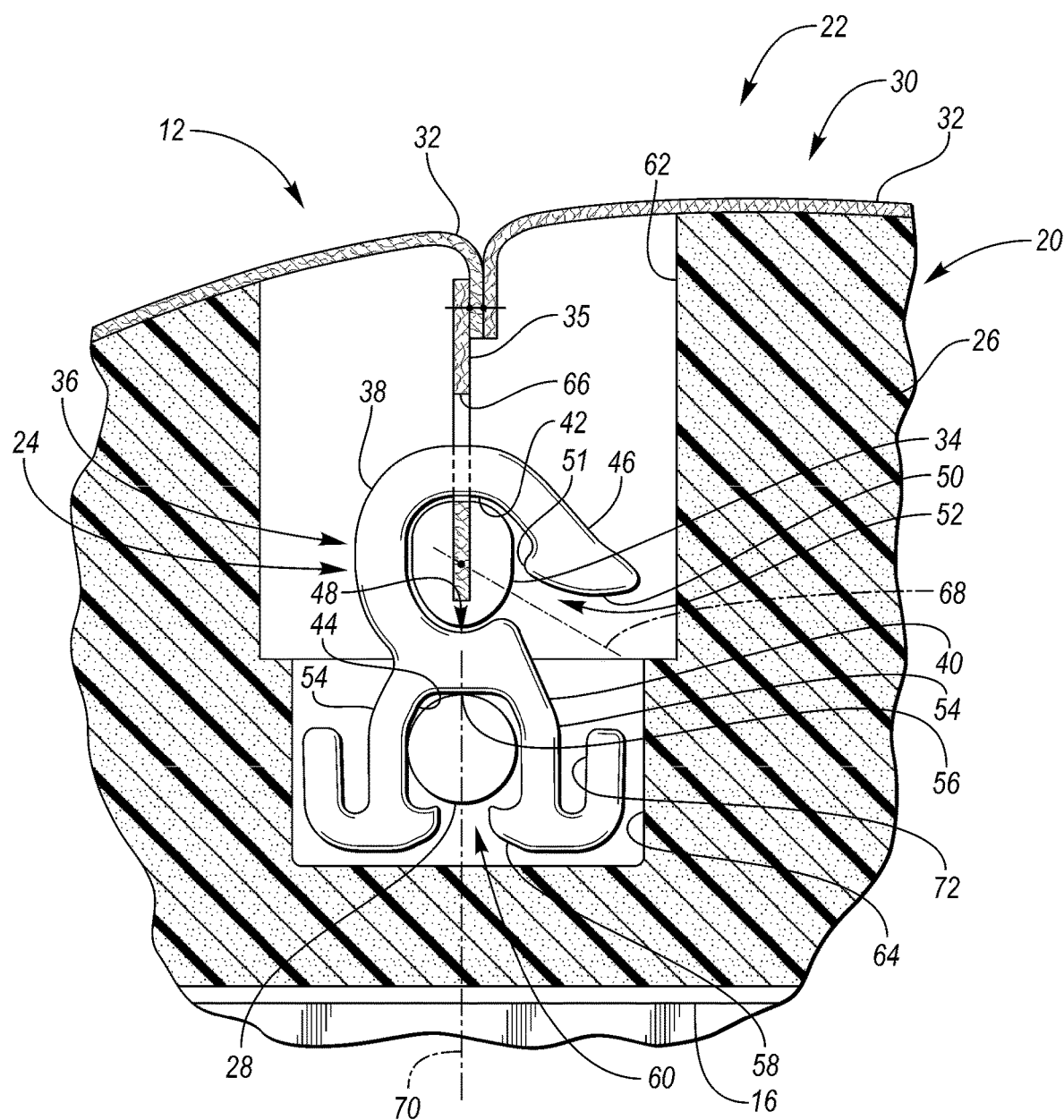
FIG. 3 is a fragmentary cross-sectional view of a portion of the seat bottom of FIG. 1.

Referring to FIGS. 1-3, additional details of the seat bottom 12 will now be described, with the understanding that the seat back 14 may have the same or similar configuration. The cushion assembly 20 of the seat bottom 12 may be directly or indirectly supported by the corresponding support structure 16. Furthermore, the cushion assembly 20 may include a seat pad or cushion 26 that is made of any suitable material, such as foam, and one or more retainers 28, such as rods or wires, attached to the cushion 26 in any suitable manner. For example, the cushion 26 may be molded around and adhered to at least a portion of each retainer 28, such as in a molding operation in which one or more retainers 28 are positioned in a mold tool, and a cushion material, such as foamable material, is poured, injected or otherwise introduced into the mold tool such that the cushion material forms around and adheres to the one or more retainers 28. As another example, each retainer 28 may be adhesively attached to the cushion 26. In addition, each retainer 28 is configured to cooperate with one or more trim clips 24, as explained below in detail.

The trim cover assembly 22 of the seat bottom 12 is disposed proximate the corresponding cushion assembly 20. Furthermore, the trim cover assembly 22 may include a trim cover 30 having one or more trim panels or sections 32, and one or more engagement features 34 attached to the trim cover 30.

In the illustrated embodiment, the trim cover 30 is disposed over the cushion assembly 20 and provides an exterior surface upon which a seat occupant may be disposed when in a seated position. Furthermore, each trim section 32 of the trim cover 30 may include an outer layer made of any suitable material, such as fabric, leather, vinyl, or combinations thereof, and may also include a thin foam layer and/or a backing layer attached to the outer layer, such as with an adhesive and/or by stitching.

Each engagement feature 34 of the trim cover assembly 22 is configured to cooperate with one or more trim clips 24 to facilitate attachment of the trim cover assembly 22 to the cushion assembly 20, as explained below in detail. Furthermore, each engagement feature 34 may have any suitable configuration, and may be made of any suitable material, such as plastic (e.g., a polymeric material). In one embodiment, for example, each engagement feature 34 may be configured as a trim bead having a generally round or oblong cross-section, as shown in FIG. 3. In another embodiment, each engagement feature 34 may be configured as a trim bead having a generally triangular or arrowhead-shaped cross-section.

Each engagement feature 34 may be provided at any suitable location, and may be attached to the trim cover 30 in any suitable manner, such as with stitching and/or an adhesive. In the embodiment shown in FIG. 2, the engagement feature 34 is molded onto an intermediate panel 35, such as a cloth (e.g., non-woven material) panel or other panel (e.g., flexible panel), that is sewn or otherwise attached to ends of adjacent trim cover sections 32.

Referring to FIGS. 2 and 3, details of one of the trim clips 24 will now be described with the understanding that the other trim clips 24 may have the same or similar configuration. In the embodiment shown in FIGS. 2 and 3, the trim clip 24 includes a clip body 36 having first and second portions 38 and 40, respectively, that define first and second openings 42 and 44, respectively. In the trim clip orientation shown in FIGS. 2 and 3, the first and second portions 38 and 40, respectively, may be referred to as top and base portions, respectively, and the first and second openings 42 and 44, respectively, may be referred to as upper and lower openings, respectively. In another orientation, such as in the seat back 14, the openings 42 and 44 may be positioned generally side-by-side. In either orientation, the openings 42 and 44 may be generally aligned with each other along a longitudinal axis of the trim clip 24. Furthermore, the first opening 42 is configured to receive an engagement feature 34 of the trim cover assembly 22, and the second opening 44 is configured to receive a retainer 28 of the cushion assembly 20.

The first portion 38 of the clip body 36 includes a flexible arm 46 that extends from the second portion 40 and that at least partially defines the first opening 42. In the orientation shown in FIG. 3, the flexible arm 46 may be referred to as an upper arm that cooperates with a surface 48 of the second portion 40, such as a top surface of the second portion 40, to define the first opening 42. The flexible arm 46 includes an angled portion (e.g., downwardly extending portion in the orientation shown in FIG. 3) having an end 50 with a retention feature that is configured to retain the engagement feature 34 in the first opening 42 when the engagement feature 34 is received in the first opening 42. For example, the end 50 may be an enlarged end having a barb 51. Furthermore, in the trim clip orientation shown in FIG. 3, the end 50 may be referred to as a downwardly extending end. The end 50 also cooperates with the second portion 40 to define a slot 52 for allowing access to the first opening 42. With the above configuration, the end 50 of the flexible arm 46 may flex or otherwise move away from the second portion 40 to allow the engagement feature 34 of the trim cover assembly 22 to snap into or otherwise enter the first opening 42. In the trim clip orientation shown in FIG. 3, for example, the end 50 of the flexible arm 46 may move upwardly in order for the trim clip 24 to snap onto the engagement feature 34.

The second portion 40 of the clip body 36 includes one or more flexible legs 54 that at least partially define the second opening 44. In the embodiment shown in FIG. 3, the second portion 40 includes a pair of flexible legs 54, such as lower flexible legs, that cooperate to at least partially define the second opening 44. In the illustrated embodiment, the second portion 40 also includes a central portion 56 that cooperates with the legs 54 to define the second opening 44. The legs 54 may each include a retention feature 58, such as a barb, and the retention features 58 may be configured to cooperate with each other to retain the retainer 28 in the second opening 44 when the retainer 28 is received in the second opening 44. The retention features 58 also cooperate to define a slot 60 for allowing access to the second opening 44. With the above configuration, one or both of the legs 54 may flex or otherwise move outwardly, e.g., the legs 54 may move away from each other, to allow the retainer 28 of the cushion assembly 20 to snap into or otherwise enter the second opening 44.

Each trim clip 24 may also be made of any suitable material and in any suitable manner. For example, each trim clip 24 may be an extruded plastic part, or an injection molded part. Furthermore, each trim clip 24 may have any suitable size and shape depending on the particular application. For example, each trim clip 24 may have a length (e.g., height in the orientation shown in FIG. 3) in the range of 14 to 40 mm, a width (e.g., side-to-side dimension in the orientation shown in FIG. 3) in the range of 12 to 20 mm, and a depth in the range of 6 to 16 mm.

Referring to FIGS. 1-3, a method of assembly of the seat bottom 12 will now be described, with the understanding that the seat back 14 may be assembled in the same or similar manner. The cushion assembly 20 may be mounted on the support structure 16 such that one or more grooves or channels 62 formed in the cushion 26 face away from the support structure 16. The cushion 26 may also have one or more openings 64 that are each aligned with a channel 62 for providing access to a particular retainer 28 attached to the cushion 26. For example, the cushion 26 may have multiple spaced apart opening 64 (e.g., spaced apart by 50 to 75 millimeters (mm)) that are aligned with a respective channel 62 for providing multiple access points to a particular retainer 28 attached to the cushion 26.

Next, multiple trim clips 24 may be attached to the trim cover assembly 22. For example, each panel 35 of the trim cover assembly 22 may include multiple spaced apart openings 66 that are each configured to receive a first portion 38 of a respective trim clip 24. The first portion 38 of each trim clip 24 may be snapped onto a particular engagement feature 34 of the trim cover assembly 22 so that the engagement feature 34 is received in the first opening 42 of the trim clip 24.

After all desired trim clips 24 have been attached to the trim cover assembly 22, the trim cover assembly 22 may then be placed over the cushion assembly 20, and each trim clip 24 may be pushed onto a respective retainer 28 so that each trim clip 24 engages and attaches to a respective retainer 28. For example, for each trim clip 24, the corresponding legs 54 may move outwardly (e.g., away from each other) in response to engagement with a retainer 28, so that the trim clip 24 may be snapped onto the retainer 28 by pushing the trim clip 24 further toward the retainer 28. The attachment of each trim clip 24 to the cushion assembly 20 may be performed manually or automatically, such as by a trim cover mounting machine.

As another example, the trim clips 24 may be attached to the retainers 28 of the cushion assembly 20 prior to attaching the trim clips 24 to the trim cover assembly 22. The trim cover assembly 22 may then be positioned over the cushion assembly 20, and each trim clip 24 may be attached to a respective engagement feature 34 of the trim cover assembly 22 in order to attach the trim cover assembly 22 to the cushion assembly 20.

With the above trim clip configuration, the trim clips 24 may be attached to the cushion assembly 20 after the cushion assembly has been formed (e.g., after the cushion 26 has been molded onto, or otherwise attached to, the retainers 28). As a result, the trim clips 24 do not need to be placed into a mold (e.g., foam mold) that may be used to form the cushion 26 of the cushion assembly 20.

Furthermore, the trim clips 24 may effectively hold the trim cover assembly 22 in a desired position with respect to the cushion assembly 20, and may inhibit folding, puckering, or wrinkling of the trim cover 30 of the trim cover assembly 22. In that regard, referring to FIG. 3, the openings 42 and 44 and slots 52 and 60 of each trim clip 24 may be configured to maintain attachment of the trim cover assembly 22 to the cushion assembly 20 during use of the seat assembly 10. For instance, for a particular trim clip 24, the slot 52 of the first portion 38 may be oriented at an angle with respect to the slot 60 of the second portion 40, to enhance retention of a particular engagement feature 34 of the trim cover assembly 22 when a seat occupant or item applies pressure on the trim cover assembly 22 (such as a downward pressure or force on the trim cover assembly 22 for a seat bottom 12, or a lateral pressure or force on the trim cover assembly 22 for a seat back 14). For example, a slot axis 68 of the slot 52 may be oriented at an angle in the range of 20 to 90° (more particularly in the range of 30 to 60° with respect to a slot axis 70 of the slot 60. As mentioned above, the retention features 51 and 58 of each trim clip 24 may also facilitate retention of an engagement feature 34 and retainer 28.

Still referring to FIG. 3, each trim clip 24 may also have one or more tool-receiving features configured to receive a tool to facilitate removal of the trim clip 24 from a particular retainer 28. For example, each leg 54 of the clip body 36 may include an outwardly extending portion that defines an opening 72, such as a groove or slot, for receiving a suitable tool, such as a screwdriver or pry member, that may be used to pry one leg 54 away from the other leg 54 so that the trim clip 24 may be removed from the retainer 28. In the trim clip orientation shown in FIG. 3, the outwardly extending portion of each leg 54 may be referred to as an upwardly extending portion.

Figure 4:
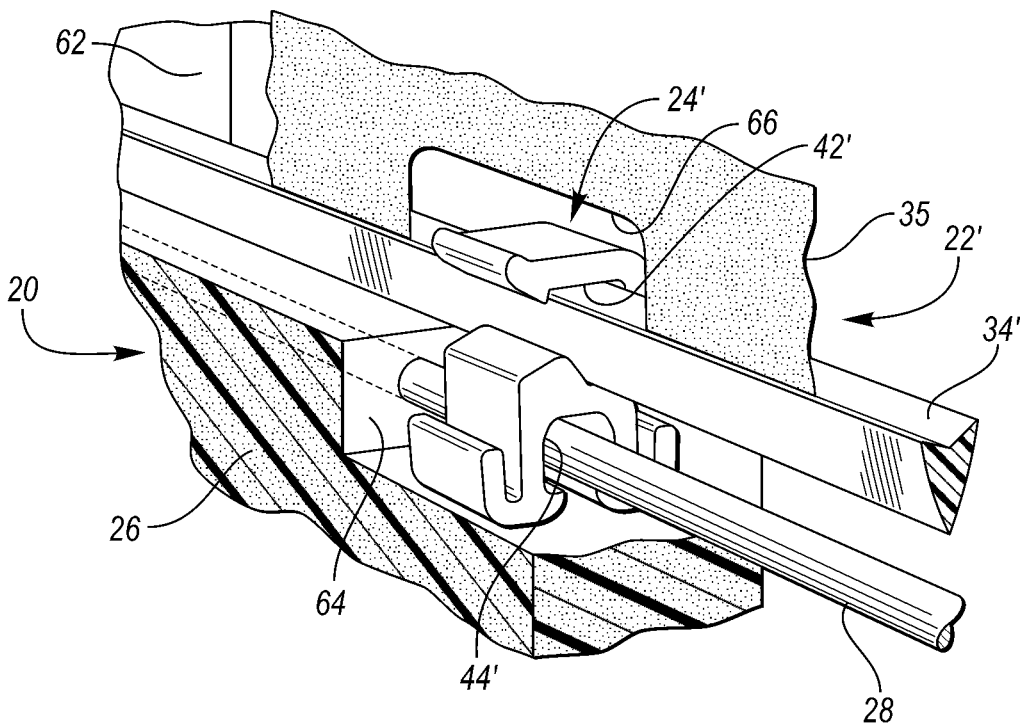
FIG. 4 is a perspective view of a second embodiment of a trim clip, according to the present disclosure, attached to a cushion assembly and a trim cover assembly.
Figure 5:
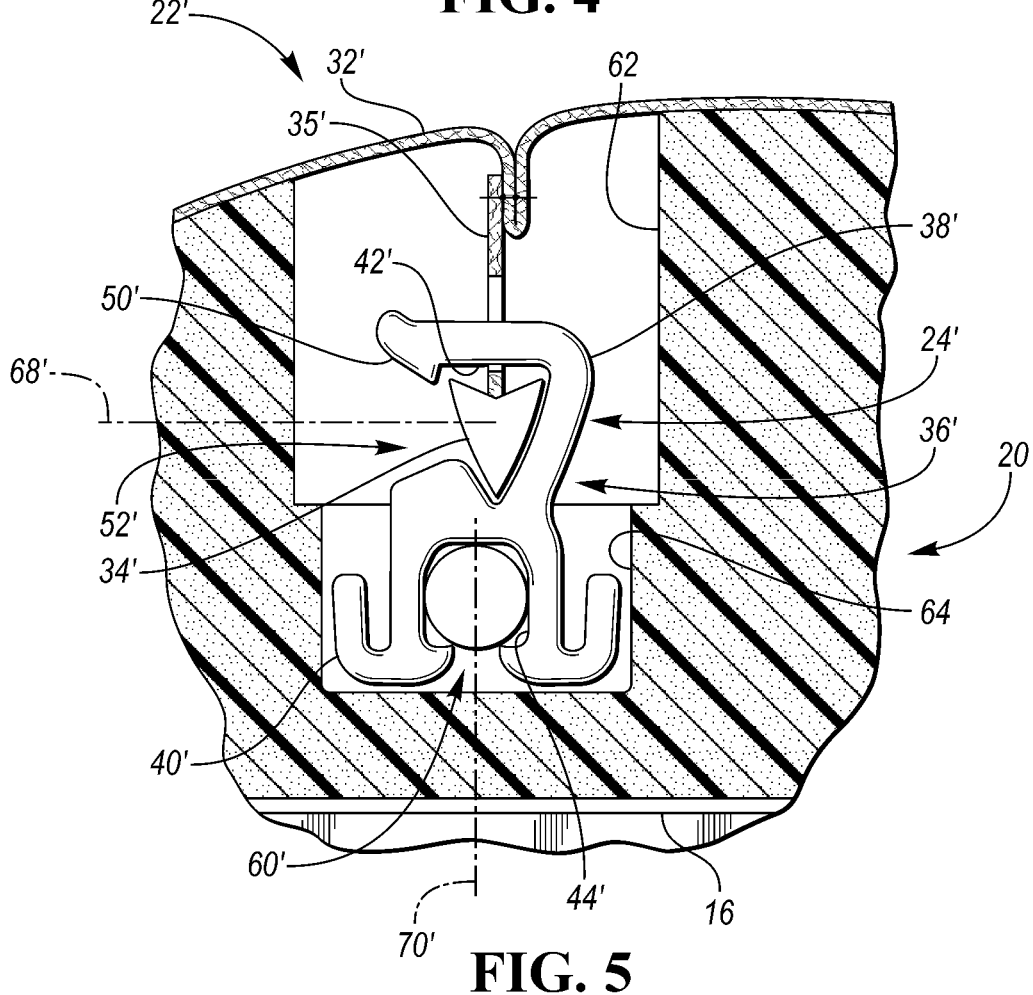
FIG. 5 is a fragmentary cross-sectional view showing the trim clip, cushion assembly and trim cover assembly of FIG. 4.

Referring to FIGS. 4 and 5, a second embodiment 24' of a trim clip according to the disclosure is shown for attaching together a cushion assembly 20 and a trim cover assembly 22'. The trim clip 24' is similar to the trim clip 24, and the same or similar features of the two embodiments are identified with the same reference numerals, except each reference numeral of the trim clip 24' includes a prime mark.

As shown in FIGS. 4 and 5, first opening 42' of trim clip 24' has a generally triangular configuration that is configured to receive (e.g., snap onto) an engagement feature 34' of the trim cover assembly 22' that has a generally triangular or arrowhead-shaped cross-section. Furthermore, in the trim clip orientation shown in FIGS. 4 and 5, the first opening 42' is a generally sideways facing opening, and second opening 44' is a generally downward facing opening. In that regard, slot 52' of clip body 36' has a slot axis 68' that extends at an angle of about 90° with respect to slot axis 70' of slot 60'. In addition, referring to FIG. 5, the openings 42' and 44' are offset with respect to each other along a longitudinal axis of the trim clip 24'.

In the embodiment shown in FIG. 5, the trim cover assembly 22' includes a single trim panel 32' that is folded at a connection location to panel 35' to create a seam or design line on an outer surface of the trim cover assembly 22'. In another embodiment, the trim cover assembly 22' may include two trim panels or sections 32' that are joined together at the panel 35' (e.g., the trim sections 32' may be sewn to the panel 35').

It should be noted that features of the trim clips 24 and 24' may be combined to form other embodiments according to the disclosure. For example, the first opening 42 of the trim clip 24 may be provided with a triangular configuration that is configured to receive an engagement feature of a trim cover assembly that has a generally triangular or arrowhead-shaped cross-section.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, as noted above, the features of various implementing embodiments may be combined to form further embodiments according to the disclosure.

What is claimed is:

1. A trim clip for attaching a trim cover to a cushion, the trim clip comprising:
a clip body having a first opening for receiving an engagement feature attached to the trim cover, and a second opening for receiving a retainer attached to the cushion, wherein the clip body is configured to be snap fit onto the engagement feature and the retainer, the clip body includes a base portion and a flexible arm that extends from the base portion, the flexible arm cooperates with a surface of the base portion to define the first opening, the base portion has a pair of flexible legs that at least partially define the second opening, the first and second openings are aligned with each other along a longitudinal axis of the clip body, the flexible arm extends past the longitudinal axis and has an end that cooperates with the base portion to define a slot for allowing access to the first opening, and the slot has a slot axis that forms an angle with the longitudinal axis in the range of 30° to 60°.

2. The trim clip of claim 1 wherein a portion of the flexible arm is configured to flex away from the base portion to receive the engagement feature in the first opening.

3. The trim clip of claim 1 wherein the flexible arm includes an enlarged end that functions as a retention feature when the engagement feature is received in the first opening.

4. The trim clip of claim 1 wherein the flexible arm includes an angled portion that cooperates with the base portion to define a slot for allowing the engagement feature to enter the first opening.

5. The trim clip of claim 1 wherein the flexible legs each include a barb, and the barbs are configured to retain the retainer in the second opening when the retainer is received in the second opening.

6. The trim clip of claim 5 wherein the barbs cooperate to define a slot for allowing the retainer to enter the second opening.

7. The trim clip of claim 1 wherein the first opening has a triangular configuration, the flexible arm defines an entire flat base of the triangular configuration, and the surface of the base portion defines a pointed tip of the triangular configuration.

8. The trim clip of claim 1 wherein each leg of the base portion includes an outwardly extending portion that defines a groove for receiving a tool that may be used to move the leg away from the other leg.

9. A seat assembly comprising:
the trim clip according to claim 1;
a trim cover assembly including a trim cover and an engagement feature connected to the trim cover, the engagement feature being snap fit into the first opening of the clip body; and
a seat pad assembly including a seat pad and a retainer connected to the seat pad, the retainer being snap fit into the second opening of the clip body.

10. The seat assembly of claim 9 wherein the flexible arm includes an enlarged end that is configured to retain the engagement feature in the first opening.

11. The seat assembly of claim 9 wherein the flexible legs of the base portion further define a slot for providing access to the second opening.

12. The seat assembly of claim 9 wherein the flexible legs each include a barb, and the barbs are configured to retain the retainer in the second opening.

13. The seat assembly of claim 9 wherein the engagement feature comprises a plastic trim bead, and the retainer comprises a wire embedded in the seat pad.

14. A vehicle seat assembly comprising:
a support structure;
a seat pad assembly positioned proximate the support structure, the seat pad assembly including a seat pad and a retainer connected to the seat pad;
a trim cover assembly disposed proximate the seat pad assembly, the trim cover assembly including a trim cover and an engagement feature connected to the trim cover; and
a trim clip that couples the trim cover assembly to the seat pad assembly, the trim clip including a clip body having a flexible arm that at least partially defines a first opening, and a base portion having a pair of flexible legs disposed on opposite sides of the base portion that at least partially define a second opening that is aligned with the first opening along a longitudinal axis of the clip body, wherein the arm extends past the longitudinal axis and has an end that cooperates with the base portion to define a first slot for providing access to the first opening, the first slot has a first slot axis that forms an angle with the longitudinal axis in the range of 30° to 60°, and the legs define a second slot for providing access to the second opening;
wherein the engagement feature of the trim cover assembly is received in the first opening of the trim clip, and the retainer of the seat pad assembly is received in the second opening of the trim clip, and wherein the arm of the trim clip has an end with a barb for retaining the engagement feature in the first opening, and each of the legs of the trim clip has a barb for retaining the retainer in the second opening.

15. The vehicle seat assembly of claim 14 wherein each leg of the base portion includes an outwardly extending portion that defines a groove for receiving a tool that may be used to move the leg away from the other leg.

16. A trim clip for attaching a trim cover to a cushion, the trim clip comprising:
a clip body having a first opening for receiving an engagement feature attached to the trim cover, and a second opening for receiving a retainer attached to the cushion, wherein the clip body is configured to be snap fit onto the engagement feature and the retainer, the clip body includes a base portion and a flexible arm that extends from the base portion, the flexible arm cooperates with a surface of the base portion to define the first opening, and the base portion has a pair of flexible legs that at least partially define the second opening, and wherein the first opening has a triangular configuration, the flexible arm defines an entire flat base of the triangular configuration, and the surface of the base portion defines a pointed tip of the triangular configuration.

17. The trim clip of claim 16 wherein each leg of the base portion includes an outwardly extending portion that defines a groove for receiving a tool that may be used to move the leg away from the other leg.

* * * * *